United States Patent
John et al.

(10) Patent No.: US 12,111,913 B2
(45) Date of Patent: Oct. 8, 2024

(54) CORE PROCESSOR AND REDUNDANT BRANCH PROCESSOR WITH CONTROL FLOW ATTACK DETECTION

(71) Applicant: Ceremorphic, Inc., San Jose, CA (US)

(72) Inventors: Lizy Kurian John, Austin, TX (US); Heonchul Park, Pleasanton, CA (US); Venkat Mattela, San Jose, CA (US)

(73) Assignee: Ceremorphic, Inc., San Jose, CA (US)

( * ) Notice: Subject to any disclaimer, the term of this patent is extended or adjusted under 35 U.S.C. 154(b) by 451 days.

(21) Appl. No.: 17/485,436

(22) Filed: Sep. 26, 2021

(65) Prior Publication Data

US 2023/0098640 A1    Mar. 30, 2023

(51) Int. Cl.
*G06F 21/52*      (2013.01)
*G06F 9/30*      (2018.01)

(52) U.S. Cl.
CPC ............ *G06F 21/52* (2013.01); *G06F 9/3001* (2013.01); *G06F 9/30076* (2013.01); *G06F 2221/033* (2013.01)

(58) Field of Classification Search
CPC .... G06F 21/52; G06F 9/3001; G06F 9/30076; G06F 2221/033
See application file for complete search history.

(56) References Cited

U.S. PATENT DOCUMENTS

| | | | |
|---|---|---|---|
| 6,085,315 A | | 7/2000 | Fleck et al. |
| 10,936,714 B1* | | 3/2021 | McIntosh .............. G06F 21/53 |
| 2001/0037447 A1* | 11/2001 | Mukherjee .......... G06F 11/1405 | |
| | | | 712/235 |
| 2003/0070062 A1 | 4/2003 | Krishnan et al. | |
| 2005/0050304 A1* | 3/2005 | Mukherjee ............ G06F 9/3851 | |
| | | | 712/218 |
| 2006/0230392 A1 | 10/2006 | Duale et al. | |
| 2008/0313384 A1* | 12/2008 | Angerbauer ............ G06F 9/382 | |
| | | | 712/229 |
| 2009/0055635 A1* | 2/2009 | Tani .................... G06F 9/30072 | |
| | | | 712/241 |
| 2009/0055674 A1* | 2/2009 | Mueller .............. G06F 9/30181 | |
| | | | 713/375 |

(Continued)

OTHER PUBLICATIONS

International Search Report dated Mar. 13, 2023.

(Continued)

*Primary Examiner* — Jason Chiang
(74) *Attorney, Agent, or Firm* — File-EE-Patents.com; Jay A. Chesavage (57) ABSTRACT

A secure processor with fault detection has a core thread which executes with a redundant branch processor thread. In one configuration, the core thread is operative on a fully functional core processor configured to execute a complete instruction set, and the redundant branch processor thread contains only initialization instructions and flow control instructions such as branch instructions and is operative on a redundant branch processor which is configured to execute a subset of the complete instruction set, specifically a branch control variable initialization and a branch instruction, thereby greatly simplifying the redundant branch processor architecture. Fault conditions are detected by comparing either a history of branch taken/not taken and branch targets, or a comparison of program counter activity for the core thread and redundant branch processor thread.

18 Claims, 7 Drawing Sheets

(56) References Cited

U.S. PATENT DOCUMENTS

| | | | |
|---|---|---|---|
| 2009/0204740 A1* | 8/2009 | Weiberle | G06F 9/3851 |
| | | | 712/229 |
| 2009/0271676 A1* | 10/2009 | Biswas | G06F 11/3466 |
| | | | 714/E11.17 |
| 2010/0050026 A1 | 2/2010 | Okabe | |
| 2011/0154503 A1* | 6/2011 | Stewart | G06F 21/14 |
| | | | 726/26 |
| 2011/0214014 A1 | 9/2011 | Bertacco et al. | |
| 2012/0137171 A1 | 5/2012 | Zalman et al. | |
| 2013/0036464 A1* | 2/2013 | Glew | G06F 9/30149 |
| | | | 726/22 |
| 2015/0278516 A1* | 10/2015 | Caprioli | G06F 9/30134 |
| | | | 726/22 |
| 2019/0121689 A1* | 4/2019 | Jeyapaul | G06F 11/0727 |
| 2019/0196912 A1* | 6/2019 | Didehban | G06F 11/1407 |
| 2019/0213322 A1* | 7/2019 | Dehon | G06F 9/4401 |
| 2020/0193013 A1* | 6/2020 | Hong | G06F 21/577 |
| 2021/0064787 A1* | 3/2021 | Saileshwar | G06F 21/54 |
| 2021/0089429 A1* | 3/2021 | Mola | G06F 11/3096 |
| 2021/0096872 A1* | 4/2021 | LeMay | G06F 9/34 |
| 2021/0182210 A1 | 6/2021 | Bui et al. | |
| 2023/0027329 A1* | 1/2023 | Durham | H04L 9/0631 |

OTHER PUBLICATIONS

Werner et al, "Protecting the control flow of embedded processors against fault attacks", Smart Card Research and Advanced Applications: 14th International Conference, CARDIS 2015 Bochum, Germany, Nov. 4-6, 2015. Revised Selected Papers 14, Springer International Publishing, 2016, Mar. 10, 2016, retrieved from https://link.springer.com/chapter/10.1007/987-3-319-31271-2_10.

* cited by examiner

*Figure 1*
Pipeline Processor with 2-way fault detection

*Figure 2*
Secure Pipelined Processor with Branch Attack Detection

Figure 3A
Core Processor Thread

```
       ⎧ andi $2,$2,0; zero register 2 (branch counter)
   302 ⎪ andi $3,$3,0 ; zero register 3 (pointer+0 to x(i)
   303 ⎨          ; and pointer+4000 to y(i))
       ⎪ addi $4,$2,100; set reg 4 (iteration end) to 100
       ⎩ addi $5, $3,a; register 5 <— constant 'a'
     ⎧ Label1: load $7, 0($3) ; load x(i) into register 7
     ⎪        load $8, 4000($3); load y(i) into register 8
     ⎪        mul $9, $7, $5; register 9=x(i)*a
 306 ⎨        add $10, $9, $8; register 10=y(i)+x(i)*a
     ⎪        store $10, 4000($3); new y(i) written to memory
     ⎪        add $3,$3,4; increment i
     ⎪        add $2,$2,1; branch count increment
     ⎩        bne $4,$2,Label1; loop for 100 cycles
```

Figure 3B
Redundant Processor Thread

```
    308 ⎰ andi $6, $6,0; zero register 6
    310 ⎱ Label2: add $6,$6,1; branch counter incrementing
              bne $4,$6,Label2
```

Figure 4A
Core Processor Thread

```
       ┌ andi $2,$2,0; zero register 2 (branch counter)
   402 │ andi $3,$3,0 ; zero register 3 (pointer+0 to x(i)
   403─┤         ; and pointer+4000 to y(i))
       │ addi $4,$2,100; set register 4 to 100
       └ addi $5, $3,a; register 5 <− constant 'a'
   ┌Label1: load $7, 0($3) ; load x(i) into register 7
   │  load $8, 4000($3); load y(i) into register 8
   │  mul $9, $7, $5; register 9=x(i)*a
   │  add $10, $9, $8; register 10=y(i)+x(i)*a
406│  store $10, 4000($3); new y(i) written to memory
   │  add $3,$3,4; increment i
   │  add $2,$2,1; branch count increment
   └  bne $4,$2,Label1; loop for 100 cycles
```

Figure 4B
Redundant Processor Thread

```
410 ── andi $6, $6,0; zero register 6
       nop; no op instructions to match above
       nop;
       nop;
Label2: nop;
       nop;
       nop;
       nop;
       nop;
412 ── add $6,$6,1; branch counter incrementing
       nop;
414 ── bne $4,$6,Label2
```

*Figure 5A*

Pgm Counter Fault Detector

*Figure 5B*

Branch Taken/Not Taken Fault Detector

Figure 6
Process for generation of Redundant Thread from Core thread

*Figure 7*
Multi-Thread Processor with Branch Attack Detection

CORE PROCESSOR AND REDUNDANT BRANCH PROCESSOR WITH CONTROL FLOW ATTACK DETECTION

FIELD OF THE INVENTION

The present invention is related to thread-secure processors. In particular, the invention relates to an architecture for detecting an intrusion of an executed program in single thread and multi-thread applications.

BACKGROUND OF THE INVENTION

Pipelined processors are well known in the art of computer architecture. Each stage of a series of pipeline stages performs an operation and forwards the result to a subsequent stage.

A generalized security problem of computer architectures is the 'code injection' problem, whereby a malicious entity replaces executable code with code performing undesired operations, typically as part of a security breach. The malicious code injection may be performed such as by a buffer overrun, whereby a long data string is input which contains executable code and the program handling the data string does not truncate or check for data length, such that a data buffer overrun occurs in memory adjacent to executable code space, resulting in the malicious code being executed from the executable code space. Many other malicious techniques may be used to perform code injection attacks.

One prior art approach is to duplicate the processors and compare results and compare results of executing identical code. However, the computation and hardware overhead required to detect and prevent execution of undesired injected code of these prior art systems results in excess power consumption and computational inefficiencies.

It is desired to provide an improved system and method for detection of execution of injected code in a pipeline processor architecture.

OBJECTS OF THE INVENTION

A first object of the invention is a secure pipelined processor comprising a primary core processor and a redundant branch processor, the primary core processor processing memory access, compute, and address arithmetic for memory addressing instructions, the redundant branch processor executing only branch initialization instructions, conditional or unconditional branch instructions, and iteration variable instructions, the primary core processor and redundant branch processor outputting branch status to a fault detector for comparison and generation of a fault detection output.

A second object of the invention is a secure pipelined processor comprising a primary core pipeline processor and a redundant branch pipeline processor, the primary core pipeline processing memory access, compute, and address arithmetic for memory addressing instructions, the redundant branch processor processing only branch initialization instructions, conditional or unconditional branch instructions, NOP instructions, and iteration variable instructions, the primary core processor and redundant branch processor outputting branch status to a fault detector for comparison and generation of a fault detection output.

A third object of the invention is a secure multithreaded processor executing a plurality of threads including a first thread and a second thread, the first thread being a core program and the second thread being a redundant branch processor program, the core program of the first thread including memory access instructions, compute instructions, and address arithmetic instructions for memory addressing instructions, the redundant branch processor program (or redundant branch processor thread) containing branch initialization instructions, conditional or unconditional branch instructions, and iteration variable instructions, multi-threaded processor outputting a list of branch status comprising at least one of a branch taken/not taken, branch direction, and branch target from the first thread and second thread to a fault detector.

A fourth object of the invention is a fault detector for a secure processor, the fault detector receiving branch status comprising at least one of a branch taken/not taken, branch direction, and a branch target from a first processor and also a second processor, the fault detector sequentially comparing the branch status and generating a fault when either a branch taken/not taken, branch direction or an offset in branch target do not match each other.

A fifth object of the invention is a process for generation of a redundant branch program from a core program, the process comprising identification of an execution loop containing an initialization instruction, an iteration instruction, and a branch instruction, the process generating the redundant branch program by identifying a new iteration variable from the initialization instruction, and generating a program comprising an initialization instruction using the new iteration variable, an iteration instruction using the new iteration variable, and a branch instruction using the iteration variable.

A sixth object of the invention is a process for generation of a redundant branch program from a core program, the process comprising identification of an execution loop containing an initialization instruction, an iteration instruction, and a branch instruction, the process generating the redundant branch program by identifying a new iteration variable from the initialization instruction, and generating a program comprising an initialization instruction using the new iteration variable, an iteration instruction using the new iteration variable, and a branch instruction using the iteration variable, and replacing other instructions with NOP instructions to maintain the number of instructions in the redundant branch program the same as the number of instruction in the core program.

SUMMARY OF THE INVENTION

In a first example of the invention, a secure processor comprises a core processor and a redundant branch processor, each of the core processor and redundant branch processor includes a plurality of pipeline stages including a Fetch Address Stage for the generation of program addresses, a Decode Stage for decoding instructions from the Program Access into individual operational actions and passing non-multiply instructions to the ALU of a First Execution Stage receiving decoded multiply instructions and performing multiplier operations, and on cycles which are not performing multiplier operations, decoding non-multiply instructions for use by a Second Execution Stage which includes an Arithmetic Logical Unit (ALU) sending results to a load/store stage. The load/store stage reads and writes results from a register file or External Memory. Data which is intended for the register file is handled by a Write Back Stage. The core processor executes control instructions, data instructions, and a subset of control instructions referred to as branch control instructions, the branch control instructions comprising at least one of: initialization instructions, branch arithmetic instructions associated with branch instructions, no operation (NOP) instructions, and branch instructions. The core processor executes a main program that includes control instructions, branch control instructions, and data instructions for performing required operations, and the redundant branch processor executes only branch control instructions, comprising at least one of: branch iteration variable initialization, conditional and unconditional branch instructions, and associated iteration variable modification instructions, such as increment or decrement of a variable associated with a conditional branch instruction. The core processor and redundant branch processor output branch status information comprising at least one of a branch taken/not taken, branch direction, and/or a branch target address. A fault detector compares the branch status information from the core processor and redundant branch processor in sequence and generates a fault detect output when a comparison of the branch status information fails. The comparison may examine a match in branch taken/not taken, branch direction, or an offset value in the branch target.

DETAILED DESCRIPTION OF THE INVENTION

Figure 1:
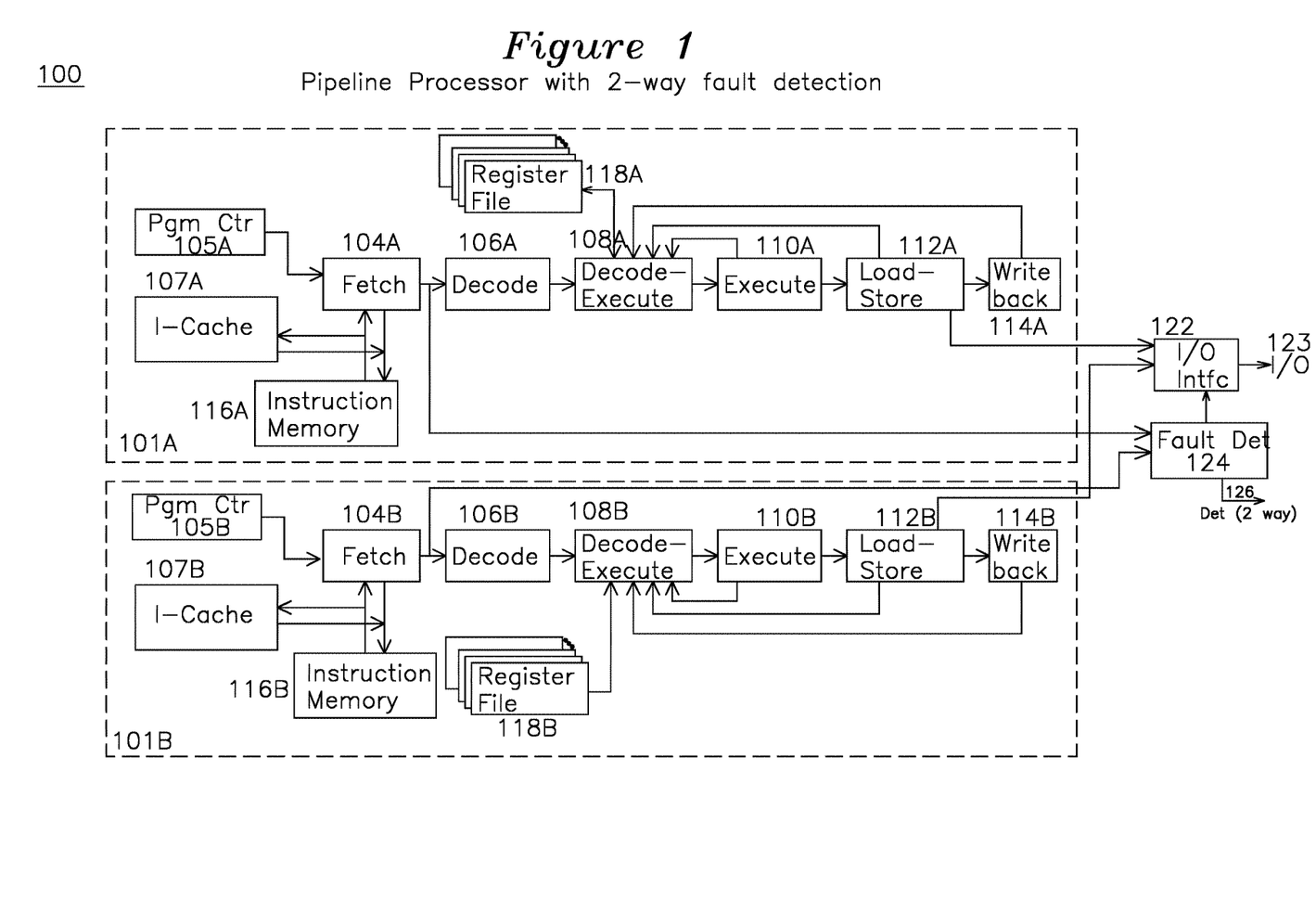
FIG. 1 shows the block diagram for a 2-way fully redundant error detecting processor.

FIG. 1 shows an example of a fully redundant fault detecting pipelined processor comprising identical processing blocks 101A and 101B, which are each executing the same program and have identical stages. Examining processor 101A, program instructions are stored in instruction memory 116A, which are fetched by fetch stage 104A using Program Counter 105A, and previously retrieved instructions may alternatively be recovered from instruction cache 107A rather than instruction memory 116A. The fetch stage 104A passes the retrieved instructions to decode stage 106A, which converts the retrieved opcode into specific operations performed by decode-execute stage 108A and execution stage 110A. Load/store stage 112A handles instructions requiring register access, and writeback stage 114A writes modified data back to an associated register file 118A. In a fully redundant fault detection mode, two identical processors are required and shown as pipelined processors 101A and 101B. The two processors execute identical instructions and the system 100 detects a mismatch between the two processors and asserts fault detection 126 based on the mismatch. It is often the case for low-power or high density processors that the detection of a fault is sufficient, causing a system re-initialization upon detection of the fault and re-establishing secure program execution. The example system of FIG. 2 doubles power consumption and system complexity as the cost of performing fault detection, and so is unacceptable for this fault detection function.

Instructions executed by the processor of FIG. 1 fall into two categories—control flow instructions such as conditional or unconditional branch instructions (including associated branch iteration variable initialization and modification instructions), and data instructions, such as those related to memory access, computation, and address arithmetic for memory addressing. An analysis of instructions for a variety of benchmarks reveals that control flow instructions such as branch instructions represent 2% to 20% of executed instructions from the various benchmarks, with branch instructions representing an average of 5% to 10% of executed instructions in typical applications. It is desired to provide an architecture which provides the security of a fully redundant architecture such as FIG. 1 while saving power through an execution architecture which makes use of the low percentage of branch instructions.

Figure 2:
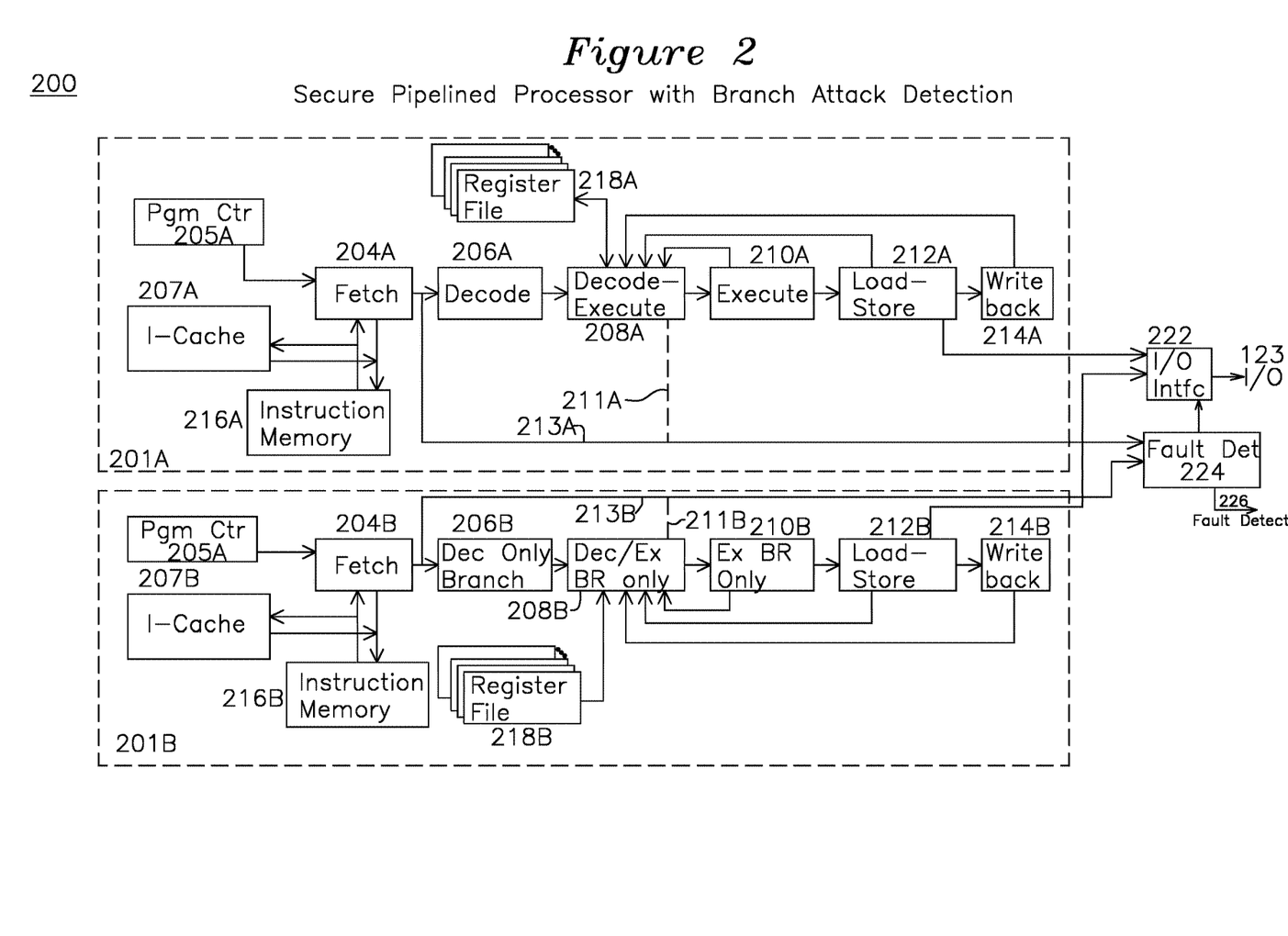
FIG. 2 shows a block diagram for a first example of the invention using a primary core pipeline processor thread a redundant branch processor thread executing instructions determined from an examination of the instructions of the primary core pipeline processor.

FIG. 2 shows an example secure processor with branch attack detection 200. In the present invention of in FIG. 2, a core processor 201A executes all instructions (control instructions, branch control instructions, and data instructions), and a redundant branch processor 201B executes a program derived from the program executed by the core processor 201A, but with the branch control instructions present, and the data instructions replaced by either NOP (no operation) instructions for equal program length, or removed and collapsed, with branch target adjusted accordingly. The fault detection 224 compares branch status information generated by the two processors, which should match each other, or have a fixed offset from each other, and generates a fault detection output 226 if a difference is detected. The execution of a branch instruction (conditional or unconditional) results in an updated status register associated with the branch. A status flag in a status register for an arithmetic operation may be "equal" "greater than", "less than", "zero", "overflow" and various other well-known examples for use in a conditional branch instruction. A branch may be either absolute (to a specific address) or relative (an offset is added to the current address identifying the new location for program execution, shown as "Label 1" and "Label 2" in FIGS. 3A/4A, and 3B/4B, respectively. When a branch is taken, this may result in a program counter offset value or absolute value applied to the program counter to generate a new branch target address (also known as a "branch target") where execution of the program will resume, and the branch direction may be forwards or backwards in program memory. In the present invention, examples for use in comparing a branch action in a core processor and redundant branch processor are generally referred to as "branch status" information, which may include one or more of branch taken/not taken, branch direction, or branch target address 211A/211B provided by decode stages 206A/206B or 208A/208B, or program counter value 213A/213B which may be provided by the fetch stage 208A/208B. The fault detector 224 may use any combination of these inputs for detection of a fault by detection of a divergence of the branch status information between the redundant branch program and the core program.

In an unequal processor embodiment of the invention, primary core pipeline processor 201A contains all of the processing elements as in any of the processors 101A, 101B, 101C of FIG. 1, and redundant branch pipeline processor 201B has reduced complexity stage elements, with the pipelined Decode stage 206B, Decode Execute stage 208B, Execute stage 210B, load/store stage 212B, and writeback stage 214B handling only specific branch control instructions described earlier, such as branch iteration variable related instructions (iteration variable initialization and modification), conditional and unconditional branch instructions, and NOP instructions, whereas the corresponding core pipeline processor 201A is configured to process all instructions, including a full set of the control and data instructions. In a first example of the unequal processor embodiment with the redundant branch processor having reduced functionality, power savings are realized by the reduced complexity of the redundant branch processor of 201B compared to core processor 201A. In this first example of the unequal processor embodiment, the primary core processor 201A executes a fully functional program, and the redundant branch processor executes a modified version of the fully functional program with NOP instructions replacing non-initialization and non-branch instructions (instructions not associated with the loop branch, loop initialization, and loop variable modification), and generating a list of branch status information for use by the fault detector, which compares a sequence of branch status information between the core processor and redundant branch processor. In this first example, the respective programs for the core processor and the redundant branch processor may execute synchronously (so the branch and program counters can be compared instantaneously), or the two programs may execute asynchronously or at different speeds and leave a branch history for comparison to detect a fault condition when the branch status information diverges between the two processes. In a second example of the unequal processor embodiment, the NOP instructions of the modified version of the fully functional program are removed, so the redundant branch processor executes only the loop variable initialization, loop variable modification, and conditional or unconditional branch instructions, creating branch status which may include at least one of: branch taken/not taken, branch direction, branch target, forming a branch target trace for use in comparison to the primary core processor by the fault detector.

In a single processor variation of the invention which separately executes the redundant branch program and core program on a single processor, the single processor may first execute the redundant branch process, or periodically execute the redundant branch process, for the purpose of pre-computing a list of branch status information. This pre-computed branch status information may be loaded into a list such as 512 of FIG. 5B, and then the single processor may thereafter switch to execution of the core process which generates a list of core processor branch status information which is loaded into 510 of FIG. 5B and each newly arriving branch status information entry verified against the corresponding sequence of 512. In this manner, the entire sequence, or parts of the sequence of branch status information may be pre-computed, or periodically computed, such as on a subroutine by subroutine, or thread by thread, basis.

In a balanced processor embodiment of the invention, the primary core pipeline processor 201A and redundant branch processor 201B have identical functionality, and in a first example of the invention, the redundant branch processor program has NOP instructions substituted for all instructions other than the loop variable initialization, loop variable modification, and loop branch instructions required to generate the branch status matching the branch status of the primary core pipeline processor, as was described for the unequal processor embodiment. In this first example for the balanced processor embodiment, power savings are realized through the execution of NOP instructions compared to the unmodified instructions of the core processor program, and the fault detector may perform a comparison of branch status (branch taken/not taken, branch direction, and branch target address) to detect a fault and assert a fault output. In a second example for the balanced processor embodiment, the NOP instructions of the first example are removed, leaving only an initialization and loop branch instructions, with the fault detector comparing branch taken/not taken, branch direction, and branch target between the core processor and redundant branch processor.

Figure 3A:
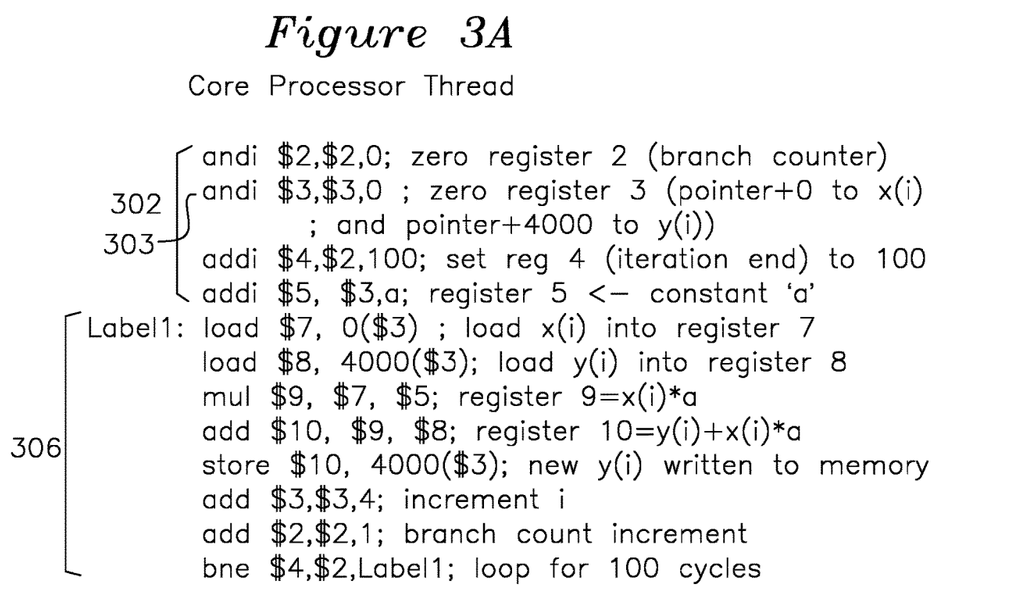
FIGS. 3A and 3B show example MIPS instructions for a core processor thread and redundant branch processor thread.
Figure 3B:
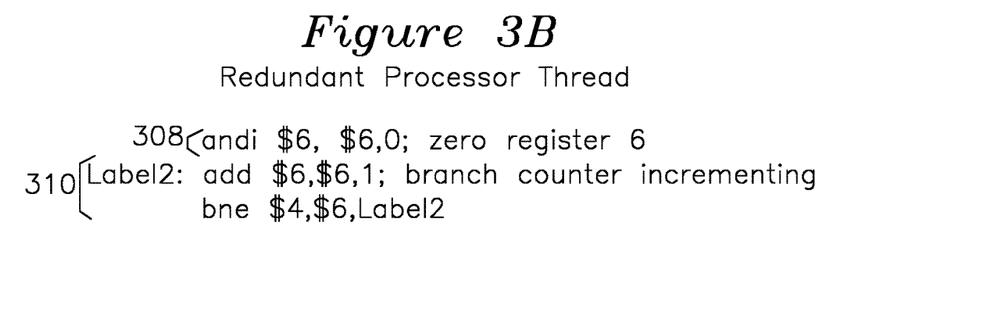

FIGS. 3A and 3B show example instructions for a multiply-accumulate operation known as "saxpy", which is an acronym for "Sum of A*X Plus Y". In the example shown, initialization steps 302 include the loop variable initialization of register 2 used as a counter for the number of branches taken, register 2 used for indirect addressing (addressing by register content) whereby register 2 plus an offset of 0 points to x(i), and register 2 plus an offset of 4000 points to y(i). Register 4 is a loop variable increment counter, in this example set to 100 for accumulating 100 values of a*x(i)+y(i), with the x(i) array starting at location 0 and the y(i) array starting at location 4000. Register 5 is the constant 'a' used in the saxpy operation, which is performed in the loop 306 as indicated, terminating when register 2 (the loop iteration variable i) reaches 100. The operations of FIG. 3A are performed in the core processor 201A. FIG. 3B shows example instructions executed by redundant branch processor 201B, where the redundant branch processor only executes a loop initialization at step 308 and loop 310 counts the number of iterations, thereby creating a list of branch status which should match the list of branch status generated by the core processor.

Figure 4A:
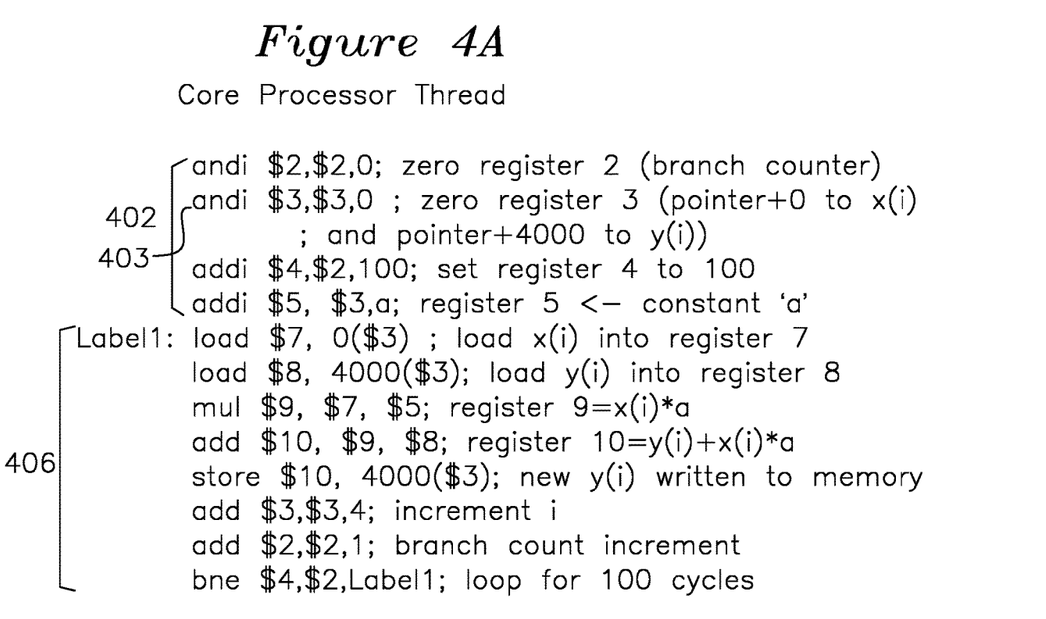
FIGS. 4A and 4B show another example of MIPS instructions for a core processor thread and redundant branch processor thread.
Figure 4B:
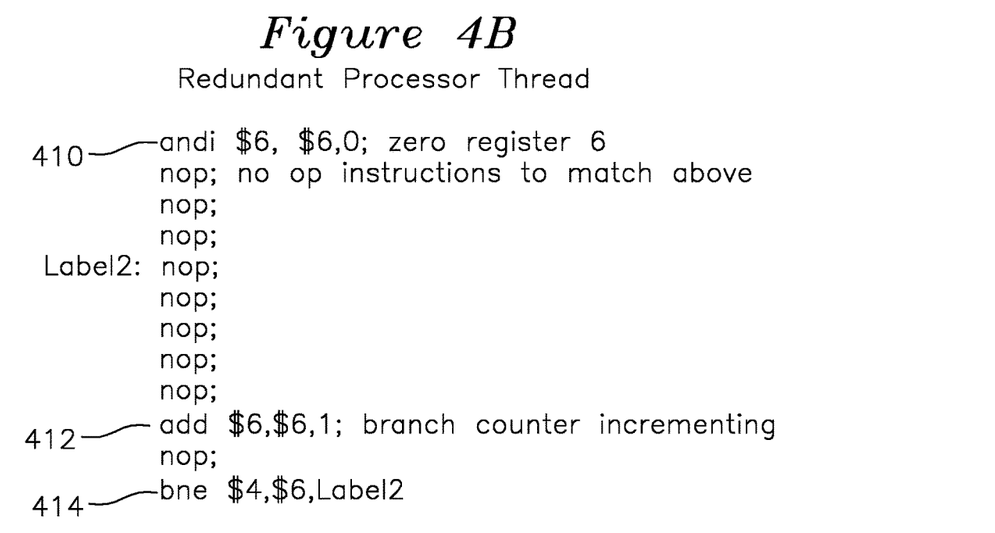

FIG. 4A shows the core processor thread of FIG. 3A. FIG. 4B shows a redundant branch processor thread, which is derived from the core processor thread of FIG. 4A by making an initialization of the branch counter register 6 and replacing other commands which are not loop branches with no operation (nop) instructions. In one example of operation, the core processor of FIG. 201A and redundant branch processor of FIG. 201B each execute one instruction per clock cycle, and are clocked together. However, the decode stage 206B, decode/execute stage 206B, execute stage 210B, load/store stage 212B, and Write back stage 214B need only support the subset of initialization and branch instruction of the reduced instruction set of FIG. 4B, whereas the core processor 201A has full capability and supports all instructions of the instruction set. In another example of operation, the core processor of FIG. 201A and redundant branch processor of FIG. 201B execute asynchronously or at different speeds, and a record of branch status such as branch taken/not taken, branch direction, and branch target are maintained for each of the core processor 201A and the redundant branch processor 201B and compared for detection of a fault.

In an example of the invention where the instructions of FIGS. 4A and 4B execute on respective core processor 201A and redundant branch processor 201B on a one instruction per clock cycle basis, the program counter of core processor 201A and redundant branch processor 201B will track each other with a fixed offset equal to the difference in memory location. If corruption of the core processor 201A program memory occurs, the branch status history of the two processors will diverge, causing a fault detect output 226 to be asserted. The fault detect may cause a reset of the system, fault reporting, or other action to be taken to restore correct operation of the processor and identify the cause of the fault.

Figure 5A:
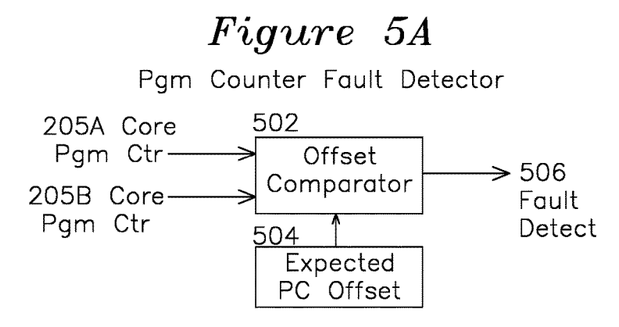
FIGS. 5A and 5B show block diagrams for fault detectors.
Figure 5B:
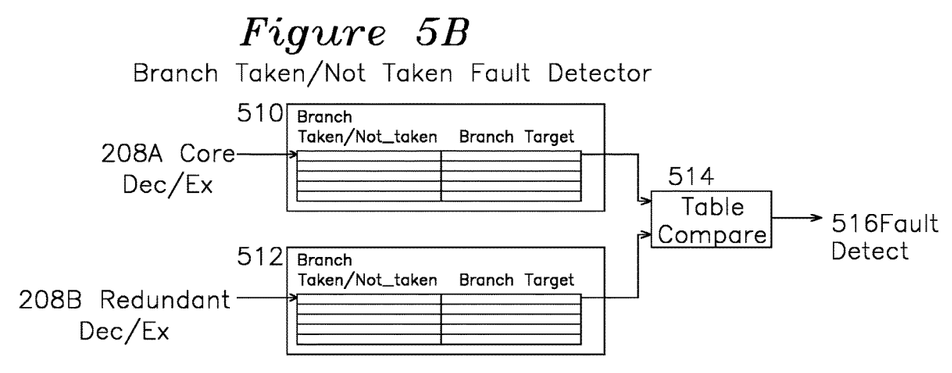

FIGS. 5A and 5B show respective example fault detectors for synchronous operation and asynchronous operation of processors 201A and 201B. FIG. 5A shows a program counter based fault detector for the core and redundant threads of FIGS. 4A and 4B, where the two threads execute in parallel on respective core and redundant processors, such that the two processors maintain respective core and redundant branch processor fixed program counter 205A and 205B offsets. Minimal branch status history is required, and offset comparator 502 compares the two program counter inputs 205A and 205B, optionally with a pre-programmed expected offset 504, and generates a fault output 506 when a difference between the two program counters exceeds the offset plus a threshold to account for asynchronous instruction execution such as one or two instructions.

In cases where the core thread and redundant branch thread operate asynchronously or at different times but have identical branch characteristics (such as the core processor thread of FIG. 3A and redundant branch processor thread of FIG. 3B with different lengths), FIG. 5B shows an example fault detector where a list of branch status history such as from a core processor 201A executing the program of FIG. 3A and redundant branch processor 201B executing the program of FIG. 3B, where the branch status history may comprise at least one of: taken/not taken, branch direction, and associated target address field, which are stored as sequential table entries, the core processor and redundant branch processor maintaining respective branch status history list 510 and 512. Table comparator 514 performs an entry by entry sequential comparison of the decisions made by the core processor and redundant branch processor, generating a fault detect output 516 upon detection of different branch results.

The invention may be practiced a variety of different ways. FIG. 2 shows a core processor 201A with a reduced capability redundant branch processor 201B, which are configured to operate concurrently, with the power savings realized by the reduction in complexity of redundant branch processor 201B, which need only have each pipeline stage support register initialization and branch control logic in the redundant branch processor 201B. In another example, the invention can also be practiced with equal capability redundant branch processor 201B, since NOP (no operation or nop) instructions consume less power because of the reduced internal activity than the original instruction replaced by a nop instruction of FIG. 4B.

Figure 7:
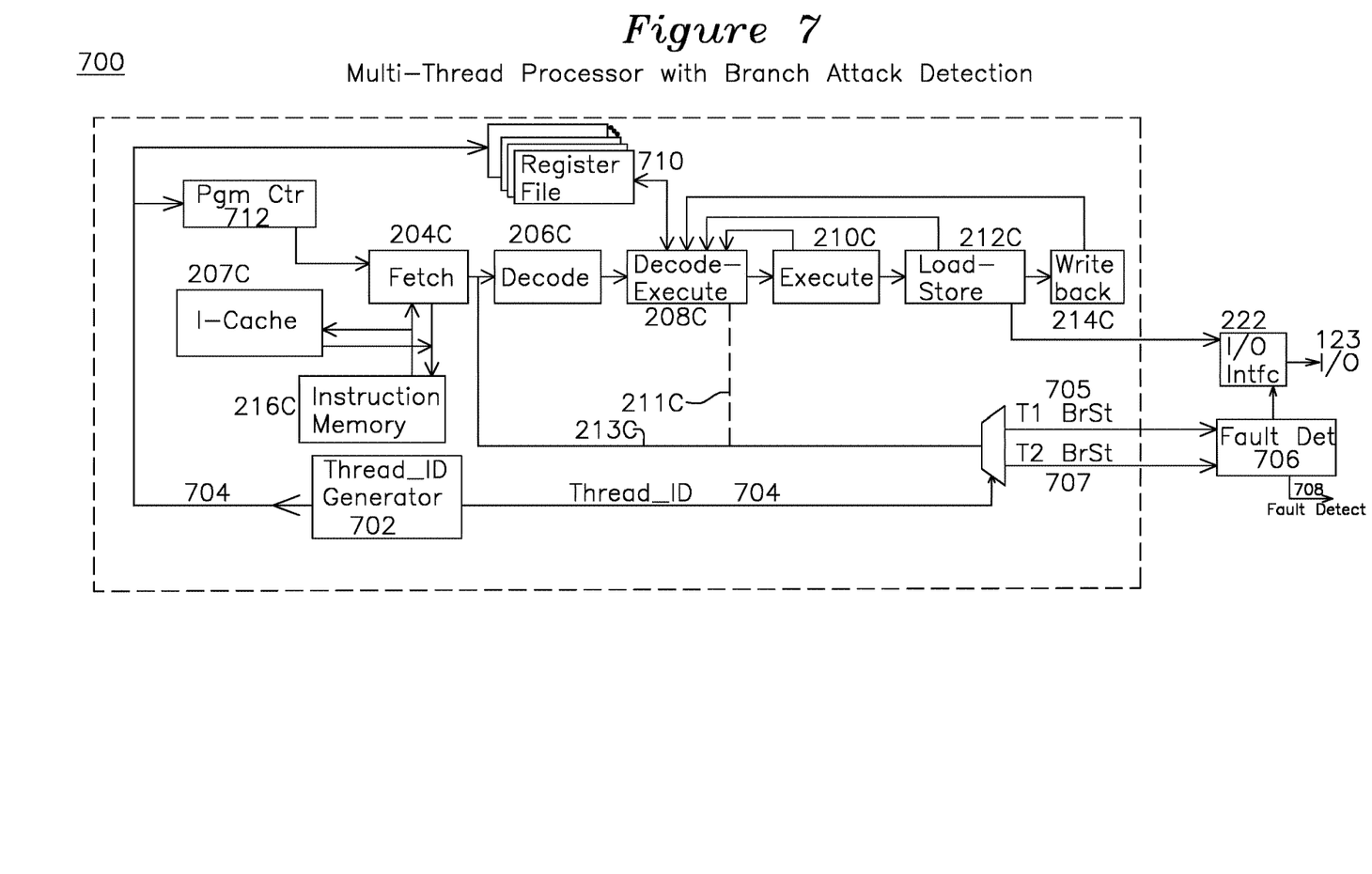
FIG. 7 shows a block diagram for a multi-thread variation of the invention.

In another example of the invention for a single pipeline processor, FIG. 7 shows a multi-threaded processor, where the core thread and redundant branch thread may operate as separate threads in a single processor 700, in one example, as sequential thread 1 (T1) and thread 2 (T2) on a single processor 700 with multi-thread capability, such as the sequence T1 T2 T1 T2 . . . described in U.S. Pat. No. 7,761,688, which is incorporated in its entirety by reference. Where a multi-thread processor executes each respective instruction of a core thread (T1) and redundant branch thread (T2) with NOP instruction replacement for non-branch related instructions, an instruction count equalization such as was shown in FIG. 4B for 4A is performed such that either a divergence in program counter of FIG. 5A or divergence in branch status such as branch taken/not taken, branch direction, and branch target address comparison of FIG. 5B may be performed, since the two threads will track each other for program counter and execution stage results for each respective thread. In this case, the single processor outputs a thread identifier (thread_id) accompanied by branch status for use by multiplexer 703, which outputs the first thread branch status (T1 BrSt 705) and second thread branch status (T2 BrSt 707) which are input to the fault detector 706 (such as the fault detector of FIG. 5B with corresponding inputs 208A and 208B). The example shown in FIG. 7 is an single processor variant of FIG. 2, with the C suffix on reference numerals indicating analogous operation. Thread generator 702 generates thread_id 702, which is used to select a particular register file associated with a thread by thread_id, as well as the program counter 712. The fault detector 706 operates as the thread detector of FIG. 5B, however, the branch status inputs to 510 and 512 of FIG. 5B are the individual branch status values, applied to each respective table 510 and 512 according to thread_id. For example, in the case where the thread_id alternates between T1 T2 T1 T2 . . . , the branch status (BS) 213 output is the corresponding sequence BS1 BS2 BS3 BS4 . . . , the thread_id is used to place BS1 and BS3 as sequential entries associated with T1, and BS2 and BS4 as sequential entries associated with T2. Alternatively, the threads may execute in an asynchronous manner, such as at different times, in which case the fault detector of FIG. 5B may be used to compare the later executing thread to the earlier executing one, which is most suitable for iterating threads with a fixed number of iterations, rather than branches which depend on tests which may temporally change. In this example, the core thread T1 may generate list 510 and the redundant branch thread T2 may generate list 512 for use by the fault detector, which compares the sequence of entries in the two lists to detect a fault condition. In another example of the invention, the processor only periodically executes the core thread and redundant branch thread for fault detection, and executes the core thread alone at other times.

Figure 6:
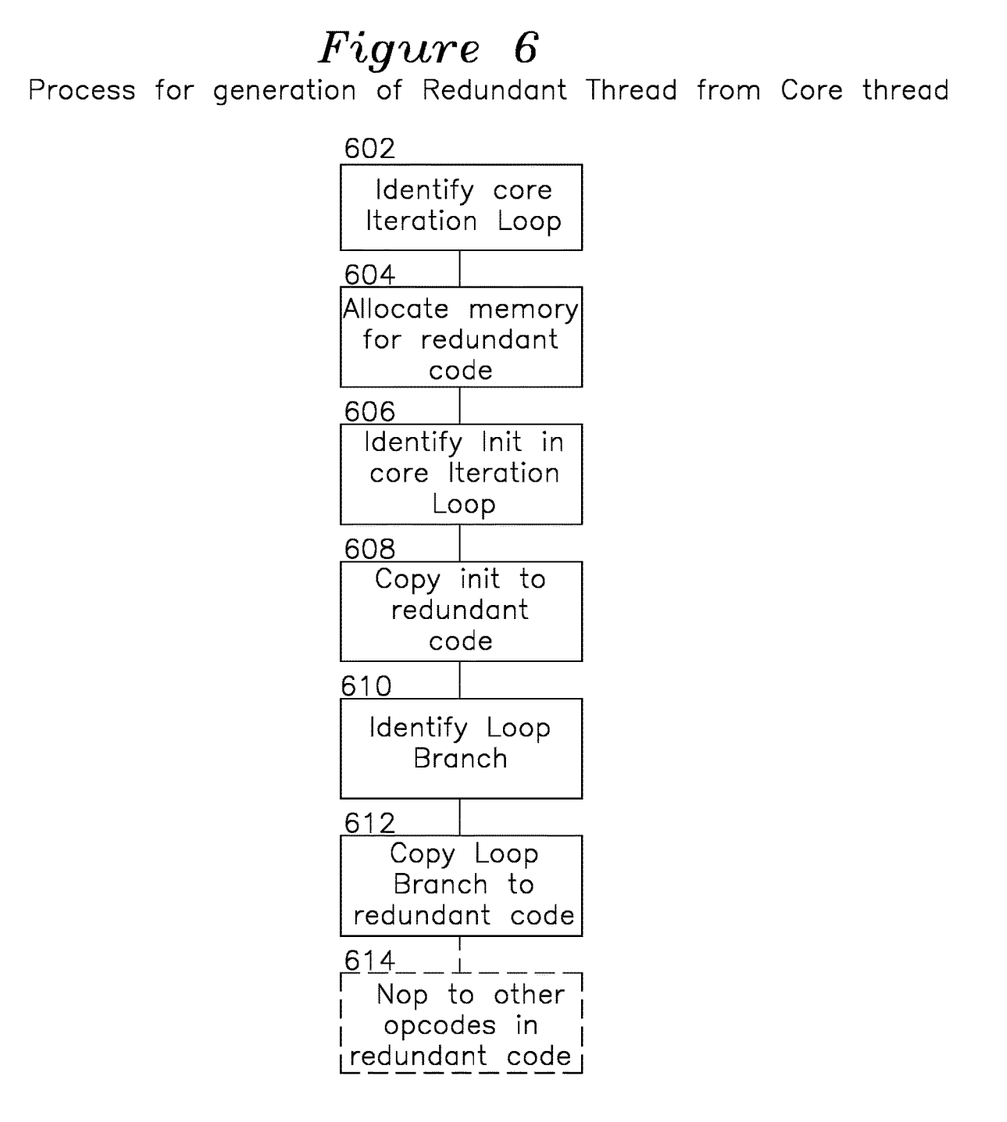
FIG. 6 shows a flowchart for generation of a redundant branch processor thread from a core thread.

FIG. 6 shows an example process for generation of redundant branch processor executable code (or program) for execution in a redundant branch processor such as 201B of FIG. 2. Step 602 identifies a core program iteration loop such as 406 of FIG. 4A and allocates memory for the redundant branch processor code 604 matching the number of instructions of FIG. 4A. Step 606 identifies the core program loop initialization such as instruction 403 of FIG. 4A and copies it to a corresponding location in the code space and identifies an unused register to use for the initialization in step 610, and copies the corresponding branch instruction to a corresponding location of the redundant branch processor code, with an offset that matches an offset in the core program and adjusts the redundant branch processor code branch instruction to use the free register of step 610. The other instructions are saved as NOP (no operation) in optional step 614, thereby creating the redundant branch processor program of FIG. 4B from the core processor program of FIG. 4A. Alternatively, the NOP instruction of step 614 is not performed, and the conditional branch follows the iteration variable modification, as was illustrated in FIG. 3B.

We claim:

1. A fault-detecting pipeline processor comprising a core processor and a redundant branch processor;

the core processor configured to execute control instructions, branch control instructions which are a subset of the control instructions, the branch control instructions including at least one of: variable initialization instructions, branch instructions, variable arithmetic instructions associated with branch instructions, and no operation (NOP) instructions;

the core processor also configured to execute control instructions and data instructions, the core processor comprising, in sequence, a fetch stage coupled to a decode stage coupled to a decode-execute stage coupled to an execute stage coupled to a load-store stage coupled to a writeback stage;

the redundant branch processor configured to execute only branch control instructions, the redundant branch processor comprising, in sequence, a fetch stage coupled to a decode stage coupled to a decode-execute stage coupled to an execute stage coupled to a load-store stage coupled to a writeback stage;

a fault detector receiving branch status values from the core processor and branch status values from the redundant branch processor, the branch status values comprising at least one of: a branch target, a branch direction, and a branch taken/not taken;

the fault detector asserting an output when at least one of a branch status comprising: a branch target, branch direction, or a branch taken/not taken of the core processor does not match a branch status comprising at least one of: a branch target, branch direction, or branch taken/not taken of the redundant branch processor;

where the core processor and redundant branch processor are configured to operate concurrently during a first time interval and are configured to operate separately during a second time interval.

2. The fault-detecting pipeline processor of claim 1 where the branch instructions include at least a conditional branch instruction or unconditional branch instruction.

3. The fault-detecting pipeline processor of claim 1 where the execution control instructions and execution data instructions include instructions from a Reduced Instruction Set Computer (RISC) instruction set.

4. The fault-detecting pipeline processor of claim 1 where the data instructions include arithmetic operation instructions.

5. The fault-detecting pipeline processor of claim 4 where the arithmetic operation instructions include an add instruction and a multiply instruction.

6. The fault-detecting pipeline processor of claim 1 where the core program performs a Sum $a*x(i)+y(i)$ operation.

7. The fault-detecting pipeline processor of claim 1 where the fault detector comprises a core processor branch table and a redundant branch processor branch table, each core processor branch table and redundant branch processor branch table being a circular queue of storage locations containing a sequence of branch status values.

8. The fault detecting pipeline processor of claim 1 where the fault detector comprises a table containing a list of branch status values comprising at least one of: branch taken/not taken, branch direction, and/or a list of branch target locations.

9. The fault detecting pipeline processor of claim 8 where the list of branch status values is computed by the redundant branch processor prior to execution of a program by the core processor.

10. A process for generating an executable redundant branch processor thread from a core processor thread, the core processor thread having at least data instructions and control instructions, the control instructions including a subset of branch control instructions including at least one of: branch control variable initialization instructions, branch control variable modification instructions, and branch instructions, the process comprising:

identifying an execution branch control in the core processor thread;

identifying a branch control initialization value for the execution branch control in the core processor thread;

identifying an execution branch control in the core processor thread and inserting a branch control initialization in a corresponding location in the executable redundant branch processor thread;

identifying a branch control conditional branch in the core processor thread and inserting a corresponding conditional branch instruction in a corresponding location of the executable redundant branch processor thread;

identifying executable instructions in the core processor thread execution branch control which are not branch control instructions and inserting no operation (NOP) instructions in the corresponding locations of the executable redundant branch processor thread;

where the core processor thread performs a Sum $a*x(i)+y(i)$ operation.

11. The process of claim 10 where the redundant branch process thread has a branch target which is a fixed offset from a corresponding branch target of the core processor thread.

12. The process of claim 10 where the control instructions and data instructions are Reduced Instruction Set Computer (RISC) instructions.

13. A process for generating an executable redundant branch processor thread from a core processor thread, the core processor thread having at least branch control instructions and data instructions, the process comprising:

identifying an execution loop in the core processor thread;

identifying an initialization value for the execution loop in the core processor thread;

identifying an execution loop variable initialization in the core processor thread and inserting an execution loop variable initialization in a corresponding location in the executable redundant branch processor thread;

identifying an execution loop variable modification in the core processor thread and inserting an execution loop variable modification in a corresponding location in the executable redundant branch processor thread;

creating a fault detection table containing a list of branch status values comprising at least one of: branch taken/not taken, branch direction, and/or a list of branch target locations, and the list of branch status values is computed by the redundant branch processor prior to execution of a program by the core processor.

14. A fault-detecting pipeline processor comprising:

a core processor configured to execute control instructions and data instructions, the control instructions including a subset of branch control instructions comprising at least one of: a no operation (NOP) instruction, branch control variable initialization instructions, branch control variable modification instructions, conditional branch instructions, unconditional branch instructions;

the core processor generating branch status comprising at least one of a branch taken/not taken, branch direction, and branch target;

a redundant branch processor configured to execute only branch control instructions, the redundant branch processor generating branch status comprising at least one of a branch taken/not taken, branch direction, and branch target;

a fault detector comparing branch status from the core processor and branch status from the redundant branch processor;

the fault detector asserting a fault output when the corresponding branch status from the core processor and redundant branch processor are not the same value;

where the redundant branch processor generates a list of branch status prior to execution of the core processor generating a list of branch status.

15. The fault-detecting pipeline processor of claim 14 where the fault detector stores the branch status from the core processor and redundant branch processor in a list.

16. The fault-detecting pipeline processor of claim 14 where the core processor is configured to execute Reduced Instruction Set (RISC) instructions.

17. The fault-detecting pipeline processor of claim 14 where the redundant branch processor branch control instructions are an unconditional branch.

18. The fault-detecting pipeline processor of claim 14 where the redundant branch processor branch control instructions are an iteration variable initialization, an iteration variable modification, and a conditional branch.

* * * * *